US005385871A

United States Patent [19]

Nigrin et al.

[11] Patent Number: 5,385,871

[45] Date of Patent: Jan. 31, 1995

[54] FLUORINE-CONTAINING LEAD- AND CADMIUM-FREE GLAZES

[75] Inventors: Jaroslava M. Nigrin; Paul L. Rose, both of Corning, N.Y.

[73] Assignee: Corning Incorporated, Corning, N.Y.

[21] Appl. No.: 206,323

[22] Filed: Mar. 7, 1994

[51] Int. Cl.[6] .......... C03C 6/06

[52] U.S. Cl. .......... 501/25; 501/26

[58] Field of Search .......... 501/25, 26, 59, 70

[56] References Cited

U.S. PATENT DOCUMENTS 4,224,074 9/1980 Reade .
4,342,553 8/1982 Graff et al. .......... 501/25 X
4,493,900 1/1985 Nishino et al. .
4,590,171 5/1986 Nigrin .
4,608,348 8/1986 Beall et al. .
5,204,291 4/1993 Nigrin .

*Primary Examiner*—Karl Group

*Attorney, Agent, or Firm*—C. S. Janes, Jr.

[57] ABSTRACT

This invention is directed to a glass frit composition essentially free from lead and cadmium exhibiting a linear coefficient of thermal expansion (25° C.–300° C.) between about $75-85\times10^{-7}/°C.$, good flow at temperatures between about 950°–1000° C., a softening point between about 650°–725° C., and excellent resistance to attack by alkaline detergent and hydrochloric acid, said frit consisting essentially, expressed in terms of weight percent on the oxide basis (except for the fluorine content), of

| | | | |
|---|---|---|---|
| $SiO_2$ | 49–55 | MgO | 0–2 |
| $B_2O_3$ | 13–20 | CaO | 1–7 |
| $Al_2O_3$ | 4.5–7 | SrO | 0–8 |
| $Na_2O$ | 5–8.5 | BaO | 0–11 |
| $K_2O$ | 5–8.5 | ZnO | 0–2 |
| $Na_2O + K_2O$ | 11–16 | F | 0.25–3. |

3 Claims, No Drawings

FLUORINE-CONTAINING LEAD- AND CADMIUM-FREE GLAZES

BACKGROUND OF THE INVENTION

The use of glazes to decorate glasses and ceramics has its roots in antiquity. In essence, glazes are transparent glasses which may be colored or clear which are applied to the surfaces of articles to provide decorative designs and finishes thereto and so enhance the aesthetic appearance thereof. Customarily, glazes are applied to the surface of an article in the form of a slurry or slip of finely-divided glass particles, termed "frit" in the art, and, after drying the slip, the frit is fired at a temperature and for a time sufficient to cause the particles to fuse and flow over the surface to form a continuous glassy coating thereon.

The most widely marketed commercial frits have contained high concentrations of lead oxide (PbO) and, less frequently, substantial amounts of cadmium oxide (CdO). Both of these oxides exhibit two characteristics which render them especially desirable for inclusion in glazing frits. First, they lower the melting point of the glass, thereby enabling it to be fused to flow along the surface of the base body to be coated at a temperature which is sufficiently low to forestall thermal deformation of the base body. Second, they raise the refractive index of the frit, thereby increasing the gloss displayed by the glaze. CdO has also been used as a colorant in certain frits. Nevertheless, because both CdO and PbO are highly toxic, very stringent regulations have been promulgated by the Federal Food and Drug Administration strictly limiting their release when compositions containing those compounds come into contact with comestibles.

Pressure from both the public and private sectors has been continuous and in increasing volume to totally eliminate lead and cadmium from materials which come into contact with food. Therefore, numerous research programs have been initiated in recent years to develop lead- and cadmium-free frits suitable for glazing articles of glass, glass-ceramic, and ceramic.

To perform satisfactorily as a glaze, a frit must satisfy at least the four following basic criteria:

(a) the frit must demonstrate good glass stability; i.e., the frit must not devitrify during the firing of the frit to fuse the glass particles into a flowing mass to coat the surface of the article;

(b) the frit must exhibit excellent resistance to attack by acids and bases to avoid corrosion of the glaze resulting in loss of gloss, the generation of haze and/or iridescence, the development of porosity, or other defects deleterious to the appearance and-/or physical character of the glaze;

(c) the firing or maturing temperature of the frit, i.e., the temperature at which the frit demonstrates sufficient flow to yield a smooth homogeneous coating, must be low enough to avert thermal deformation of the article being coated; and (d) the linear coefficient of thermal expansion of the frit must be compatible with that of the article being glazed in order to avoid crazing and/or spalling, with the preferred frits exhibiting a linear coefficient of thermal expansion somewhat lower than that of the article being glazed, thereby placing the matured coating under compressive stress when the glazed article is cooled to room temperature.

Corning Incorporated, Corning, N.Y., markets a glass-ceramic dinnerware product as Corning Code 0308 under the trademark SUPREMA®. That product is encompassed within U.S. Pat. No. 4,608,348 (Beall et al.) in that it contains potassium fluorrichterite as the predominant crystal phase with cristobalite as a secondary phase in an amount of about 10-20% by volume and consists essentially, expressed in terms of parts by weight on the oxide basis, of about

| | | | | | |
|---|---|---|---|---|---|
| $SiO_2$ | 66.8 | $K_2O$ | 4.75 | $Sb_2O_3$ | <0.1 |
| $Al_2O_3$ | 1.7 | $Na_2O$ | 3.3 | NiO | 0.014 |
| MgO | 14.5 | $Li_2O$ | 0.8 | $Co_3O_4$ | 0.0015 |
| CaO | 4.4 | $P_2O_5$ | 1.15 | $Fe_2O_3$ | 0.02. |
| BaO | 0.21 | F | 3.74 | | |

Because the sum of the recited components closely approximates 100, for all practical purposes the individual values may be deemed to represent weight percent. The precursor glasses for the dinnerware are crystallized in situ to the glass-ceramic state through heat treatment at temperatures of about 950°-1000° C., with the glass-ceramic exhibiting a linear coefficient of thermal expansion over the temperature range of 25°-300° C. between about $120\text{-}140\times10^{-7}/°C$.

U.S. Pat. No. 5,204,291 (Nigrin) discloses lead- and cadmium-free glazes expressly designed for coating SUPREMA® dinnerware. The frits therefor consisted essentially, expressed in terms of weight percent on the oxide basis, of

| | | | |
|---|---|---|---|
| $SiO_2$ | 51-59 | CaO | 0-7 |
| $Li_2O$ | 0-2 | SrO | 0-12 |
| $Na_2O$ | 3.5-7 | BaO | 0-9 |
| $K_2O$ | 6-8.5 | ZnO | 0-10 |
| $Li_2O+Na_2O+K_2O$ | 10-15 | CaO+SrO+BaO+ZnO | 8-18 |
| $B_2O_3$ | 9-12 | $Al_2O_3$ | 4.5-7. |

The frits demonstrated linear coefficients of thermal expansion over the temperature range of 25°-300° C. between about $70\text{-}85\times10^{-7}/°C$. and good flow at temperatures between about 900°-1000° C. The preferred glaze compositions consisted essentially of

| | | | |
|---|---|---|---|
| $Li_2O$ | 1-2 | SrO | 2.5-6.5 |
| $Na_2O$ | 4-7 | $B_2O_3$ | 10-11.5 |
| $K_2O$ | 6.5-8 | $Al_2O_3$ | 5-6.5 |
| ZnO | 7-9.5 | $SiO_2$ | 55.5-58.5. |

Whereas those glazes generally exhibited excellent resistance to attack by acids and bases, good gloss at the firing temperatures, and good compatibility in thermal expansion with the SUPREMA® ware, they interacted with the SUPREMA® ware surface during glaze maturing, thereby producing a crystalline interlayer with very large crystals, those crystals comprising mainly magnesium, potassium, zinc, and silicon oxides. The crystals exhibit a roedderite structure and, consequently, demonstrate a low linear coefficient of thermal expansion (estimated to be about $30\times10^{-7}/°C$. over the temperature range of 25°-300° C.). Because those large crystals exhibiting such low coefficients of thermal expansion were sandwiched between SUPREMA® ware with a linear coefficient of thermal expansion of about $120\times10^{-7}/°C$. and a glaze with a linear coefficient of thermal expansion of about $80\times10^{-7}/°C$., stresses are created in the interface which can weaken the body/glaze bond lead to spalling.

Laboratory experiments have indicated that roedderite crystals are developed only with frits containing more than about 1% by weight ZnO, and that $Li_2O$ acts as a mineralizer in the system. Removal of those two components, however, raised the melting temperatures of the frits too high to be operable for glazing SUPREME® dinnerware.

Accordingly, the primary objective of the present invention was to devise CdO- and PbO-free frits which are preferably also free of $Li_2O$ and ZnO suitable for glazing SUPREMA® dinnerware.

SUMMARY OF THE INVENTION

That objective can be achieved with glass frits which are essentially free of CdO, $Li_2O$, PbO, and ZnO, which exhibit a linear coefficient of thermal expansion (25°-300° C.) between about $75-85\times10^{-7}$/°C., which exhibit good flow at 950°-1000° C., which exhibit a softening point between about 650°-725° C., and which exhibit excellent resistance to attack by acids and detergents consisting essentially, expressed in terms of weight percent on the oxide basis (except for the fluorine content), of

| | | | |
|---|---|---|---|
| $SiO_2$ | 49-55 | CaO | 1-7 |
| $B_2O_3$ | 13-20 | SrO | 0-8 |
| $Al_2O_3$ | 4.5-7 | BaO | 0-11 |
| $Na_2O$ | 5-8.5 | F | 0.25-3. |
| $K_2O$ | 5-8.5 | | |
| $Na_2O+K_2O$ | 11-16 | | |

As employed herein, the expression "consisting essentially of" renders the glass composition open only for the inclusion of unspecified ingredients which do not materially affect the basic and novel characteristics of the glass. For example, whereas the preferred glass compositions will be essentially free of additional constituents, minor amounts, perhaps up to 2% each, of such oxides as MgO and ZnO, depending upon the remainder of the base composition, and up to 0.5% $Li_2O$ may be present, the amounts of the latter two components being sufficiently low to avoid the development of roedderite crystals. Also, whereas the above compositions yield a transparent glaze, where a colored glaze is desired, colorants conventional in the glass art, e.g., CoO, $Cr_2O_3$, CuO, $Fe_2O_3$, $MnO_2$, NiO, $V_2O_5$, selenium, and the rare earth metal oxides, can be incorporated in customary amounts, commonly up to about 2%. In general, however, the total of all such optional inclusions will be less than about 5%. As utilized herein, the expression "essentially free of" indicates that no substantial amount of a particular constituent is intentionally included in the glass composition.

When the $Li_2O$ and ZnO were eliminated from the frits of U.S. Pat. No. 5,204,291, it was necessary to increase the $B_2O_3$ content to 13% to produce a glaze exhibiting adequate flow at about 950°-1000° C. to be operable with SUPREMA® dinnerware. Those glasses, however, displayed very poor resistance to acids. The addition of fluorine improved this resistance very significantly.

The more preferred compositions consist essentially, expressed in terms of weight percent on the oxide basis, of about

| | | | |
|---|---|---|---|
| $SiO_2$ | 50-55 | $Na_2O+K_2O$ | 12-15 |
| $B_2O_3$ | 13-16 | CaO | 1.5-6 |
| $Al_2O_3$ | 5-7 | SrO | 2-8 |
| $Na_2O$ | 5.5-7.5 | BaO | 4-11 |
| $K_2O$ | 6-8 | F | 0.5-2.25. |

In addition to U.S. Pat. No. 5,204,291, the following patents are of interest in providing background technology in the field of lead- and cadmium-free glazes:

U.S. Pat. No. 4,224,074 (Reade) discloses frits exhibiting linear coefficients of thermal expansion (20°-300° C.) between about $50-110\times10^{-7}$/°C. and a viscosity suitable for firing at about 650°-775° C., the frits consisting essentially, in weight percent, of

| | | | | | | | |
|---|---|---|---|---|---|---|---|
| $SiO_2$ | 29-55 | $Al_2O_3$ | 2-8 | $Na_2O$ | 4-20 | $Na_2O+Li_2O$ | 6-24 |
| $B_2O_3$ | 7-31 | $ZrO_2$ | 5-16 | $Li_2O$ | 0-7 | F | 0.75-4. |

The total absence of alkaline earth metal oxides and the high $ZrO_2$ content place those frits outside the present inventive composition system.

U.S. Pat. No. 4,493,900 (Nishino et al.) describes enamels devised for coating metals consisting essentially, in weight percent, of

| | | | | | |
|---|---|---|---|---|---|
| $SiO_2$ | 31-39 | ZnO | 5-20 | $ZrO_2$ | 0-5 |
| $B_2O_3$ | 13-21 | $Al_2O_3$ | 0-5 | $Al_2O_3+TiO_2+ZrO_2$ | 2-9 |
| $Na_2O$ | 14-21 | $TiO_2$ | 0-5 | F | 2-10. |
| $K_2O$ | 1-5 | | | | |

The total absence of alkaline earth metal oxides and the high concentrations of $Na_2O$ and ZnO place those frits outside of the subject inventive composition.

U.S. Pat. No. 4,590,171 (Nigrin) is directed to frits demonstrating softening points between 600°-625° C. and linear coefficients of thermal expansion (20°-300° C.) between about $57-62\times10^{-7}$/°C., the frits consisting essentially, in weight percent, of

| | | | | | |
|---|---|---|---|---|---|
| $Li_2O$ | 3-4 | $B_2O_3$ | 14-17.5 | $ZrO_2$ | 6.75-10.5 |
| $Na_2O$ | 0.75-3 | $Al_2O_3$ | 6.75-8.75 | F | 3-4. |
| BaO | 3.5-9.5 | $SiO_2$ | 48-55 | | |

The low alkali metal oxide content, the high level of $Li_2O$, and the high concentration of $ZrO_2$ place those frits outside of the instant inventive compositions.

DESCRIPTION OF PREFERRED EMBODIMENTS

Table I records a number of glass compositions, expressed in terms of weight percent on the oxide basis (except for the fluoride content), illustrating the composition parameters of the subject invention. Because it is not known with which metal cation(s) the fluorine is combined and the quantity thereof is small, it is merely reported as fluorine in accordance with conventional glass analysis practice. The actual batch ingredients may comprise any materials, either oxides or compounds, which, when melted together, will be converted into the desired oxide in the proper proportions. For example, $CaCO_3$ and $Na_2CO_3$ can constitute the source of CaO and $Na_2O$, respectively. The fluorine can be conveniently incorporated as an alkali metal or an alkaline earth metal fluoride.

The batch ingredients were compounded, thoroughly blended together to assist in obtaining a homogeneous melt, and charged into platinum crucibles. The crucibles were introduced into a furnace operating at about 1400° C. and the batches melted for about 3 hours. Thereafter, one portion of each melt was poured into a steel mold to form a glass slab having dimensions of about 7.62×7.62×1.27 cm (3″×3″×0.5″) and that slab was transferred immediately to an annealer operating at about 450° C. The remainder of each melt was poured as a fine stream into a bath of tap water, a practice termed "drigaging" in the glass melting art, to yield finely-divided glass particles which, after drying, were further comminuted by milling to produce particles averaging about 15 μm in size.

Whereas the above description is directed to a laboratory melting and forming practice, it must be recognized that the glass compositions recorded in Table I falling within the ranges of the present invention can be melted and formed utilizing conventional commercial glaze smelting units with standard equipment and techniques. It is only necessary that glass batches of appropriate formulations be prepared, those batches fired at a temperature and for a time sufficient to secure homogeneous melts, and those melts subsequently cooled and ground to a frit of desired grain sizes.

TABLE I

| | 1 | 2 | 3 | 4 | 5 | 6 |
|---|---|---|---|---|---|---|
| $SiO_2$ | 54.1 | 53.5 | 52.6 | 52.1 | 51.1 | 50.6 |
| $Na_2O$ | 6.5 | 6.4 | 6.5 | 6.4 | 6.5 | 6.4 |
| $K_2O$ | 7.4 | 7.3 | 7.4 | 7.3 | 7.4 | 7.3 |
| CaO | 3.7 | 3.7 | 1.8 | 1.8 | 1.8 | 1.8 |
| SrO | 3.4 | 3.4 | 6.8 | 6.7 | 3.4 | 3.4 |
| BaO | 5.1 | 5.1 | 5.1 | 5.1 | 10.0 | 9.9 |
| $B_2O_3$ | 14.0 | 13.9 | 14.0 | 13.9 | 14.0 | 13.9 |
| $Al_2O_3$ | 5.8 | 5.7 | 5.8 | 5.7 | 5.8 | 5.7 |
| F | — | 1.0 | — | 1.0 | — | 1.0 |

| | 7 | 8 | 9 | 10 | 11 |
|---|---|---|---|---|---|
| $SiO_2$ | 52.7 | 52.1 | 52.3 | 51.3 | 50.3 |
| $Na_2O$ | 6.5 | 6.4 | 7.3 | 7.3 | 7.3 |
| $K_2O$ | 7.4 | 7.3 | 6.8 | 6.8 | 6.8 |
| CaO | 2.4 | 2.4 | 5.5 | 5.5 | 5.5 |
| SrO | 4.5 | 4.5 | — | — | — |
| BaO | 6.7 | 6.6 | — | — | — |
| $B_2O_3$ | 14.0 | 13.9 | 19.5 | 19.5 | 19.5 |
| $Al_2O_3$ | 5.8 | 5.7 | 5.4 | 5.4 | 5.4 |
| ZnO | — | — | 1.7 | 1.7 | 1.7 |
| MgO | — | — | 1.5 | 1.5 | 1.5 |
| F | — | 1.0 | — | 1.0 | 2.0 |

Bars were cut from the glass slabs for use in determining the linear coefficient of thermal expansion (Exp) over the temperature range of 25°-300° C., expressed in terms of $\times 10^{-7}$/°C., the softening point (S.P.) expressed in °C., a qualitative assessment of resistance to attack by alkaline detergents (Deter), a qualitative assessment of resistance to attack by hydrochloric acid (Acid), and a qualitative assessment of resistance to attack by coffee (Coffee).

The assessment of resistance to detergent attack involved the following procedure:

(1) a 0.3% by weight aqueous solution of SUPER SOILAX® detergent, marketed by Economics Laboratories, St. Paul, Minn., is prepared;

(2) that solution is heated to 96° C.;

(3) samples are immersed into the hot solution; and (4) after an immersion of 72 hours, the samples are withdrawn from the solution, washed in tap water, dried, and inspected visually to observe any change in the gloss of the glaze.

The assessment of resistance to attack by hydrochloric acid involved the following procedure:

(1) an aqueous 5% by weight HCl solution is prepared;

(2) samples are immersed into the solution maintained at room temperature; and (3) after an immersion for 24 hours, the samples are withdrawn from the solution, washed in tap water, dried, and inspected visually to observe any change in the gloss of the glaze.

The assessment of the resistance to attack by coffee involved the following procedure:

(1) a solution of percolated coffee is prepared;

(2) with the solution at 96° C., samples are immersed therein; and (3) after an immersion of 24 hours, the samples are withdrawn from the solution, washed in tap water, dried, and inspected visually to observe any change in the gloss of the glaze.

In Table II, samples were deemed to fail the test when visual observation descried even a minor change in the appearance of the gloss.

The softening points and linear coefficients of thermal expansion were determined employing measuring techniques conventional in the glass art.

TABLE II

| | 1 | 2 | 3 | 4 | 5 | 6 |
|---|---|---|---|---|---|---|
| S.P. | 703 | 685 | 704 | 678 | 699 | 674 |
| Exp. | 81.9 | 82.5 | 82.3 | 83.6 | 83.9 | 83.0 |
| Deter | Pass | Pass | Pass | Pass | Pass | Pass |
| Acid | Fail | Pass | Fail | Pass | Fail | Pass |
| Coffee | Fail | Pass | Fail | Pass | Fail | Pass |

| | 7 | 8 | 9 | 10 | 11 |
|---|---|---|---|---|---|
| S.P. | 698 | 681 | 677 | 669 | 659 |
| Exp | 83.0 | 81.8 | 76.4 | 78.1 | 79.3 |
| Deter | Pass | Pass | Pass | Pass | Pass |
| Acid | Fail | Pass | Fail | Pass | Pass |
| Coffee | Fail | Pass | Fail | Pass | Pass |

The criticality of composition control is clearly evidenced through a comparison of Examples 2, 4, 6, 8, 10, and 11 with Examples 1, 3, 5, 7, and 9.

Example 4 is considered to be the most preferred embodiment of the inventive compositions.

I claim:

1. A glass frit composition essentially free from lead and cadmium exhibiting a linear coefficient of thermal expansion (25° C.-300° C.) between about 75-85$\times 10^{-7}$/°C., good flow at temperatures between about 950°-1000° C., a softening point between about 650°-725° C., and excellent resistance to attack by alkaline detergent and hydrochloric acid, said frit consisting essentially, expressed in terms of weight percent on the oxide basis (except for the fluorine content), of

| | | | |
|---|---|---|---|
| $SiO_2$ | 49-55 | MgO | 0-2 |
| $B_2O_3$ | 13-20 | CaO | 1-7 |
| $Al_2O_3$ | 4.5-7 | SrO | 0-8 |
| $Na_2O$ | 5-8.5 | BaO | 0-11 |
| $K_2O$ | 5-8.5 | ZnO | 0-2 |
| $Na_2O + K_2O$ | 11-16 | F | 0.25-3. |

2. A glass frit according to claim 1 which is essentially free from MgO and ZnO.

3. A glass frit according to claim 1 consisting essentially of

| | | | |
|---|---|---|---|
| $SiO_2$ | 50-55 | $Na_2O+K_2O$ | 12-15 |
| $B_2O_3$ | 13-16 | CaO | 1.5-6 |

-continued

| | | | |
|---|---|---|---|
| $Al_2O_3$ | 5-7 | SrO | 2-8 |
| $Na_2O$ | 5.5-7.5 | BaO | 4-11 |
| $K_2O$ | 6-8 | F | 0.5-2.25. |

* * * * *